358-74. OR 3,465,095 SR

16544
X 6506

SEARCH ROOM

Sept. 2, 1969 R. B. HANSEN ETAL 3,465,095

AUTOMATIC BEAM INTENSITY LIMITER

Filed April 26, 1967 2 Sheets-Sheet 1

Inventors
ROBERT B. HANSEN
ERNEST C. MACINTYRE JR.
By Mueller, Aichele & Rauner
ATTYS.

1C

Inventors
ROBERT B. HANSEN
ERNEST C. MACINTYRE JR.
BY Mueller, Aichele & Rauner
ATTYS.

United States Patent Office 3,465,095

Patented Sept. 2, 1969

3,465,095
AUTOMATIC BEAM INTENSITY LIMITER

Robert B. Hansen, Arlington Heights, and Ernest C. Macintyre, Jr., Villa Park, Ill., assignors to Motorola, Inc., Franklin Park, Ill., a corporation of Illinois Filed Apr. 26, 1967, Ser. No. 633,927
Int. Cl. H04n *3/16, 5/38, 3/44*
U.S. Cl. 178—5.4 12 Claims

ABSTRACT OF THE DISCLOSURE

The average direct current component of a video signal may be of sufficient magnitude to increase the average cathode ray beam intensity beyond a predetermined level. The beam limiter includes a sensing network to derive a control voltage indicative of such intensity and a control circuit which generates an output potential in response to the control voltage. Such potential is coupled to the direct current signal path which applies the video signal to the cathode ray tube to reduce the direct current voltage thereon to limit the beam intensity to the predetermined level.

Background of the invention

In present day television receivers, a detector circuit is used to convert an incoming television signal into a video signal which is then amplified, processed and coupled to the cathode ray tube for reconversion into an image. The video signal includes synchronizing pulses for deflection purposes and video information interposed between successive pulses. In accordance with the usual mode of transmitting, the synchronizing pulses are maintained at a fixed reference voltage commonly referred to as black level and is independent of picture content. In order that the shading of the image accurately corresponds to the transmitted signal, the black level at the cathode ray tube should be fixed by DC coupling the detector circuit to the cathode ray tube.

Most "black and white" television sets have substantially less than 100% DC coupling for a variety of reasons, one of which arises from the transmitted signal not having the same black level from station to station. The fact that the DC coupling is reduced does not deteriorate the black and white picture significantly because the average viewer cannot detect the difference between true black and grayish black and, on the other hand, between true white and grayish white.

In color television sets, however, different considerations are present because the saturation and hue of the colors are much more noticeably affected by deviations from a constant black level. Thus it has been proposed to provide maximum DC coupling between the detector circuit and the cathode ray tube to provide maximum authenticity of the reproduced color image. With such a system it has been found that with certain picture contents and/or certain brightness and contrast settings, the average direct current component of the video signal at the cathode ray tube is of sufficient amplitude to increase the beam intensity beyond a safe value. Such increase may significantly reduce the high voltage to the cathode ray tube, deteriorate picture focus, destroy resolution and subject other parts of the receiver including the cathode ray tube to damage. It is desirable to eliminate such adverse effects but since picture highlights are conveyed by instantaneous high beam intensities, only the average beam intensity should be affected. Although these effects are particularly noticeable in a DC coupled set, a beam intensity limiting circuit may be employed in any television set, whether AC or DC coupled, whether color or black and white.

Summary of the invention

It is therefore an object of this invention to provide a television receiver having DC coupling between the detector circuit and the cathode ray tube without the above mentioned adverse effects arising.

Another object is to limit the average beam intensity of the cathode ray tube to a predetermined value.

Another object is to maintain the average beam intensity in a cathode ray tube below a safe value and at the same time not to affect a beam intensity which is instantaneously high.

A further object is to improve reproduction of color images in a color television receiver by controlled DC coupling of the detector circuit to a tri-gun cathode ray tube.

The television receiver according to this invention includes a video amplifier system having a direct current signal path to the input electrode of a cathode ray tube for applying a video signal thereto. The average intensity of the cathode ray beam, which is representative of the average direct current component of the video signal at the input electrode, may exceed a predetermined level. A beam limiter system includes sensing means to derive a control voltage indicative of the average beam intensity and a control circuit having amplifying means coupled between the sensing means and the direct current supply paths to derive an output potential. The control circuit also includes a device to select a threshold level to cause the output potential to be constant for a control voltage below the threshold level to permit the average direct current component to vary the average beam intensity. The device has a value selected to cause the output potential to vary in proportion to the amount that the cotnrol voltage exceeds the threshold level to clamp the average direct current component to a value where average beam intensity cannot exceed the predetermined level.

Description of the preferred embodiment

Figure 1:
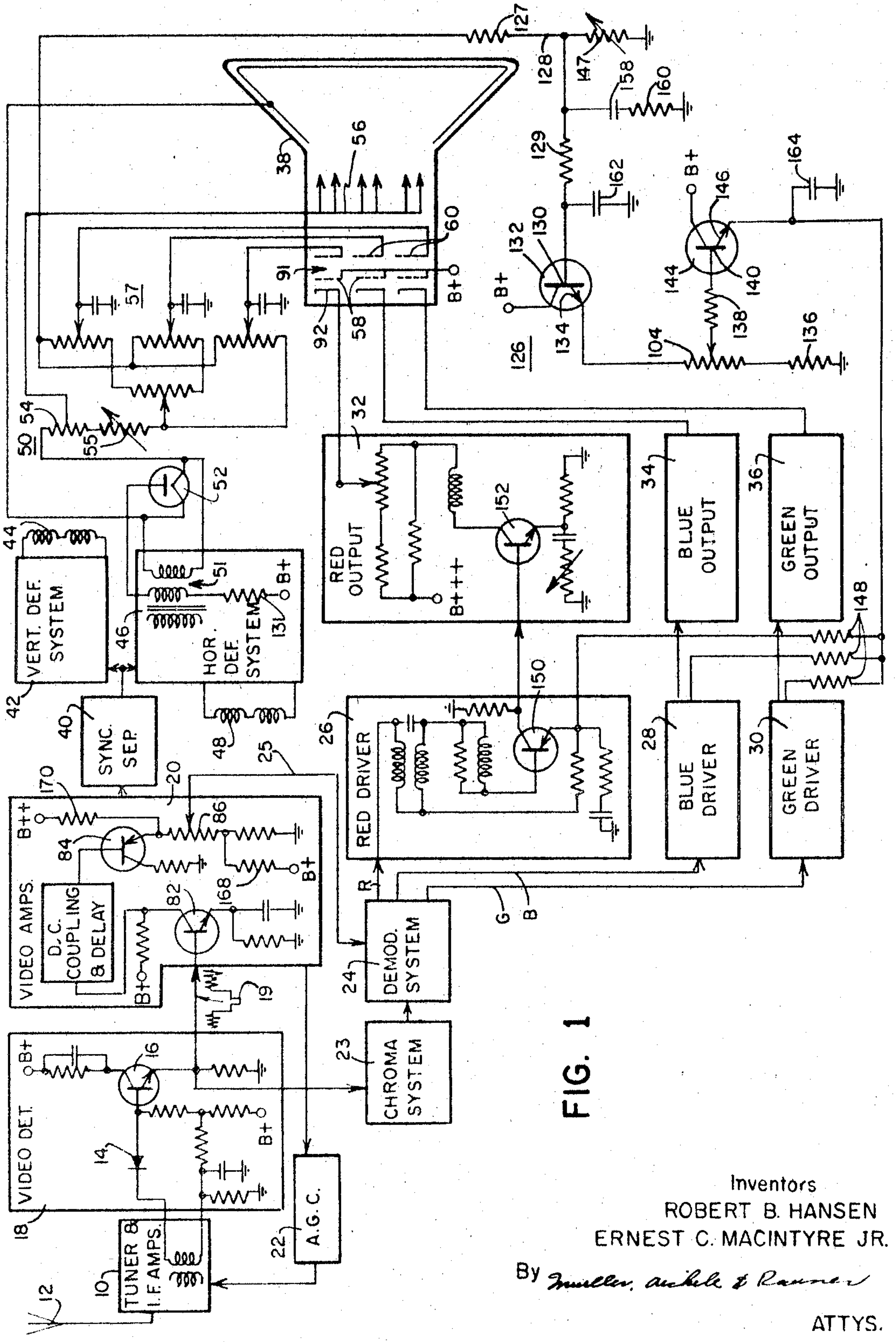
FIG. 1 illustrates a color television receiver partially in block and partially in schematic incorporating the features of this invention.

Referring now to FIG. 1, there is shown a color television receiver including circuitry 10 which converts a received color television signal at antenna 12 into an intermediate frequency signal. The intermediate frequency singal is applied to a video detector 18 which includes a detector diode 14 and an emitter follower transistor 16 to furnish a demodulated video signal 19 having luminance components, chrominance components and synchronizing components. The video signal 19 is amplified by video amplifier system 20 and coupled to an automatic gain control circuit 22 which develops a signal indicative of the amplitude of the video signal to control the gain of amplifier devices in circuitry 10.

The composite video signal 19 from detector 18 is applied to chroma system 23 which filters and amplifies the chrominance components and applies the same to the demodulator system 24. The luminance components of the video signal on conductor 25 are DC coupled from the video amplifier system 20 to the demodulator system 24 wherein the chrominance components are demodulated with the luminance components to provide separate red, blue and green representative signals to be amplified by the respective driver circuit 26, 28 and 30. After further amplification by respective ones of the output amplifiers 32, 34 and 36, the representative signals are applied to the cathodes of the tri-gun cathode ray tube 38 to individually drive the electron guns in accordance with known operation for production of a composite image in color.

The signal from video amplifier system 20 is applied to sync separator circuit 40 which derives vertical synchronizing pulses for the vertical deflection system 42 which in turn generates a sawtooth current through the vertical yoke 44 disposed on the neck of the cathode ray tube 38. The horizontal pulses from sync separator circuit 40 are applied to the horizontal deflection system 46 which develops a sawtooth signal in yoke 48 for horizontal scanning of the cathode ray beam. A high voltage system 50 is coupled to a transformer 51 in horizontal deflection system 46 and includes a high voltage rectifier 52 to supply high voltage on the order of 27 kv. to the final anode of cathode ray tube 38. An extremely high value voltage divider 54 has a tap connected to the focus electrode 56 of cathode ray tube 38. In series with divider 54 is a potentiometer 55 to permit adjustment of picture focus. The system 50 also includes a plurality of controls 57 to independently adjust the screen electrodes 60, commonly referred to as the G2 electrodes, to compensate for differences in the characteristics of the three electron guns. The control grid electrodes 58 commonly referred to as the G1 electrodes are coupled to a B+ source which although shown as fixed, may be variable.

The DC characteristics of the television receiver will be explained by reference to FIG. 2, which illustrates video signals at the output of the video detector 18. For the moment, assume they are the outputs of the detector in a black and white set in which case the signals 62, 64 and 66 respectively represent white, gray and black pictures. The video detector 18 demodulates the intermediate frequency signal so that the bottoms of the respective synchronizing pulses 68 are established at a fixed level 72 commonly referred to as the black level and is independent of picture content. If the black level is retained all the way to the cathode ray tube 38 by 100% DC coupling, an accurate image will appear, that is, signal 62 will provide white, 64 gray and 66 black.

On the other hand, if the signals are AC coupled to the cathode ray tube, they will be centered about their associated average direct current (DC) component axis. Since the duration of the blanking intervals 74 is approximately one-seventh of the entire cycle, the average direct component may be computed and is shown for the white signal 62 to be level 76, for the gray signal 64 to be level 78, and for the black signal 66 to be level 80. Thus, with 100% AC coupling, the three signals will have only slight difference in amplitude below their average DC axes and therefore they depict substantially the same shade whereas they should depict black, gray and white. As the percent of DC coupling is increased, the shading approaches the true value. In fact, most present day black and white sets do have some percent of DC coupling and/or DC restoration in order to provide to some degree a "constant" black level. Even with some AC coupling, the inaccuracies resulting thereby are not extreme because normal pictures are not all black nor all white but rather continuously vary and therefore are translated by AC coupling. In such case, that is with minimal large background areas, it has been learned that the viewer is not bothered by the grayish blacks and whites.

Figure 2:
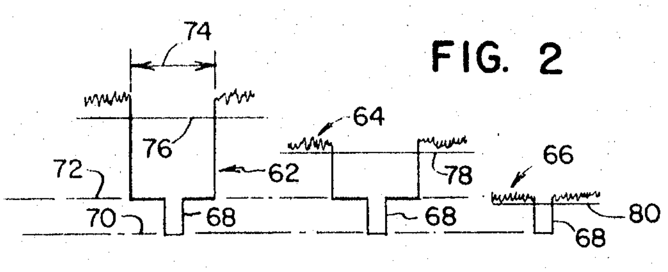
FIG. 2 illustrates a series of video signals having different average DC components.

However, in color receivers, the signals of FIG. 2 provide the luminance components which combine with the chrominance components in demodulator system 24 to provide the separate color signals. The amplitude of the luminance components will dictate both the hue and saturation of the demodulated colors where slight deviations from proper values may provide markedly incorrect colors. Thus, in color receivers it is highly desirable that there be 100% DC coupling between the video detector 18 and the cathode ray tube 38 to retain the black level (preferably the chrominance components are also DC coupled to insure an accurate representation). With this in mind and referring back to FIG. 1, the video signal 19 is amplified by transistor 82, delayed, and DC coupled to a further amplifier transistor 84 at the emitter of which is coupled to a contrast control potentiometer 86. The movable arm thereof is 100% DC coupled through the demodulator system 24, through the driver circuits 26–30, and the output amplifiers 32–36 to the cathode ray tube 38.

When DC coupling is employed, an undesirable effect thereof is that the video signals at the cathodes are prone to have amplitudes to cause the total average cathode ray beam current or beam intensity to exceed a predetermined value above which a number of undesirable effects occur, some of which are as follows. First, as the beam current increases, the load presented to the high voltage system 50 likewise increases and although the system has some regulation, the high voltage applied to the cathode ray tube may drop considerably from its 27 kv. nominal values to thereby degrade the image. Secondly, the focus voltage is tapped from voltage divider 54 so that with a sufficient decrease in high voltage the picture can no longer be properly focused. Thirdly, voltage for the screen electrodes 60 are supplied from the controls 57 which are also coupled to the high voltage system so that a sufficient drop may result in changes in the cutoff characteristics of the cathode ray tube to "wash" out the picture and deteriorate resolution. Fourthly, the signal which is rectified by the high voltage rectifier 52 is supplied from the horizontal deflection system 46 and sufficient loading thereof will consume a significant portion of the deflection power to thereby deteriorate horizontal scan. Lastly, the cathode ray tube 38, the high voltage rectifier 52, and amplifying devices in the horizontal deflection system 46 may be damaged by excessive currents.

How these adverse effects may occur can be explained by reference to FIG. 3 which illustrates a graph of the transfer characteristic 90 of one of the guns 91 of cathode ray tube 38. Since each gun has a similar characteristic, the following explanation will be directed toward the red gun 91 and its associated cathode 92. In order to avoid the adverse effects just discussed, the average beam current or beam intensity of each gun cannot exceed a predetermined level 93. When the video signal 19 has a given amount of red information and the scene being transmitted is relatively bright, a signal 94 is applied to the cathode 92 to cause the beam intensity to have an appearance represented by waveform 96. The average DC component 98 of signal 94 relative to any fixed voltage such as B+++ causes the average beam intensity 100 to be less than level 93.

If the brightness of the video signal 19 decreases, there will be a proportional decrease in the amplitude in each of the signals applied to the respective guns. But since there is 100 percent DC coupling between the detector 18 and the cathode ray tube 38, the black level 72 will remain constant as explained previously and the bottom of the signal will rise as shown by signal 102. If the viewer is not pleased with the picture, he would adjust a viewer accessible potentiometer 104, which will be explained later, to proportionately increase the brightness of the three signals applied to the cathode ray tube by reducing the black level to level 106. If with this control setting, the brightness of the transmitted picture increases to the same brightness level of signal 94, then signal 108 will be applied to cathode 92 and the beam intensity will have the appearance of waveform 110. Now the average DC component 112 of signal 108 has lowered relative to B+++ to cause the average beam intensity 114 to exceed the predetermined level 93 and therefore one or more of the previously discussed adverse effects may occur. Instead of increasing the brightness, if the viewer increased the contrast by adjusting the control potentiometer 86 when a dim scene is received, a subsequent increase in brightness to that of signal 94 would cause signal 116 having an average DC component 118 relative to B+++ to be applied to cathode 92. The beam intensity waveform 120 then has an average beam intensity 122 which exceeds the level 93.

A number of other conditions may occur to cause the average beam intensity to exceed level 93 such as an extremely bright scene with normal brightness and contrast settings or tuning between stations where there is no signal to turn the cathode ray tube off. If the dim scene being transmitted, as represented by signal 102, includes a bright object, there will be a spike 123 in the beam intensity waveform 124 which exceeds level 93 although the average beam intensity 125 will experience a negligible change and since it is only the average which causes the adverse effects, it is unnecessary to eliminate such a spike. In fact, even though the peak exceeds level 93 it is important that these bright conditions are retained so that the details are reflected in the color image.

Protection against the average beam currents exceeding level 93 is provided by automatic beam limiter system 126 which includes sensing means comprised of resistor 127, the potentiometer 54 and the controls 57, coupled to the high voltage system 50. Alternatively the control voltage may be derived across a resistor 131 connected from the bottom of the primary winding of the high voltage transformer 51. This resistor is in the series path between the diode 52 and the cathode ray tube final anode. Even if the high voltage system 50 is perfectly regulated, the voltage across resistor 131 will change with average beam intensity. As the beam intensity increases, the high voltage applied to the final anode of cathode ray tube 38 decreases to provide a control voltage indicative of beam intensity on conductor 128.

The control voltage is applied to a feedback or control circuit which includes an arc protection resistor 129 coupled to the base 130 of an emitter follower NPN transistor 132. The emitter 134 is coupled through the brightness control potentiometer 104 and a resistor 136 to ground. The movable arm of potentiometer 104 is coupled through an arc protection resistor 138 to the base 140 of a second emitter follower NPN transistor 144, the emitter 146 of which is coupled through three resistors 148 to respective ones of the emitters of the driver circuits 26, 28 and 30. The collectors of transistors 132 and 144 are coupled to a B+ potential.

A threshold level potentiometer 147 connected from the conductor 128 to ground is set so that when the average beam intensity is less than level 93, the control voltage on conductor 128 is of sufficient magnitude to saturate transistor 132 which in turn saturates transistor 144 to provide an output potential approximately equal to B+ on emitter 146 and is constant at such value as long as the beam intensity is less than level 93. The output potential is coupled through each of the resistors 148 to, for example, the emitter of PNP transistor 150 of driver amplifier 26 to provide the operating voltage therefor. Since the collector of NPN transistor 152 in red output amplifier 32 is DC coupled to transistor 150, and since the operating voltage (output potential) is constant, the black level remains fixed at the level determined by potentiometer 104 and the average DC component at the cathode ray tube is permitted to freely vary with the video content and with changes in brightness and contrast.

Now assume that the brightness is increased by adjusting potentiometer 104 so that the peaks of the synchronizing pulses 68 are at level 106, and the content of the video signal 19 at the output of detector 18 is such as to provide signal 108 at cathode 92. Now the average beam intensity exceeds level 93 and the high voltage from system 50 decreases to the point where the control voltage on conductor 128 is no longer sufficient to saturate transistor 132 so that the voltage on emitter 134 decreases as does the voltage on emitter 146 to decrease the operating potential on the emitter of transistor 150. The resulting increase in the quiescent voltage on the collector of transistor 152 serves to "raise" the black level of signal 108 and thus raise the average DC component 112 relative to B+++ to decrease the average beam intensity 114 back to level 93. The increase in black level is proportional to the amount that the average beam intensity attempts to exceed level 93 to maintain the average DC component constant so that the average beam intensity is constant at level 93. Similarly, a signal 116 will have its black level increased to maintain the average DC component and thus the average beam intensity constant at level 93.

It should be noted that the output potential on emitter 146 in the beam limiter system 126 only varies the operating voltage for the transistor in the driver circuits 26–30. This causes no change in the bias so that the gain of the transistor is not affected and the peak-to-peak amplitude of the signal, and thus the contrast, does not change. The same is true of the transistors in the output amplifiers 32–36 so that the only effect of the varying operating potential is to move the entire signal up or down by moving its black level (and thus its average direct current component) to cause an apparent decrease in DC coupling to the cathode ray tube. It would be undesirable to change the peak-to-peak amplitude because that would unnecessarily change the contrast. This may more easily be understood by referring to the beam intensity waveform 110 where the brightness potentiometer 104 was adjusted to change the black level. If instead of automatically moving the black level of the corresponding signal 108 back to level 72, the gain was changed, the black level of the waveform 110 would remain as shown, and therefore, a black object which causes a spike in the waveform 110 would appear gray.

Figures 3, 4:
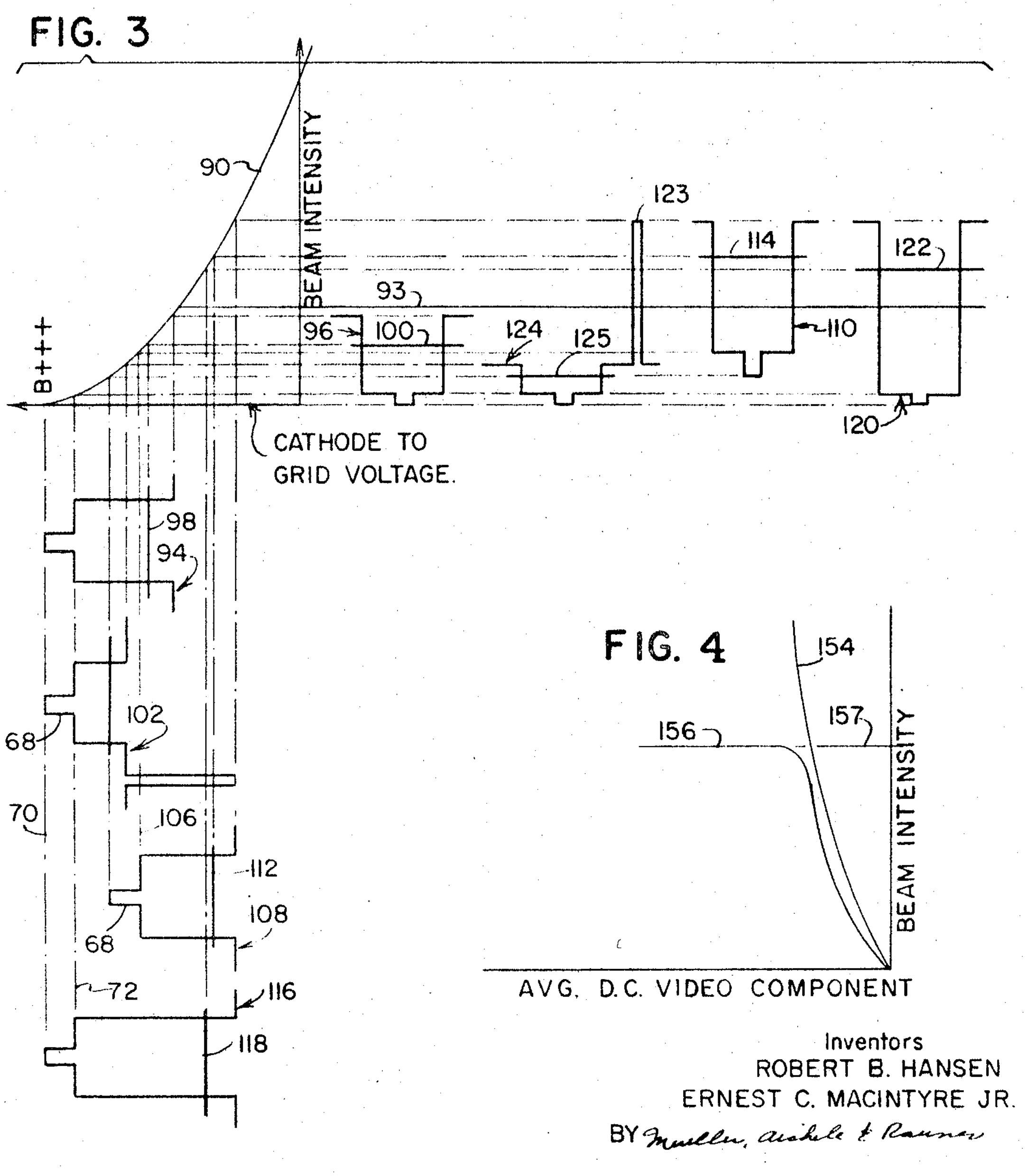
FIG. 3 illustrates a cathode ray tube transfer characteristic with voltage and current waveforms useful in explaining the operation of the invention.
FIG. 4 illustrates the response of the automatic beam limiter system.

Referring now to the graph of FIG. 4, there is shown a curve 154 representing the increasing beam intensity as the average DC component decreases relative to B+++ without the beam limiter system 126. When the system is used, the curve 156 results and as shown, the beam intensity increases as the average DC component decreases relative to B+++ up to the threshold level 157 established by threshold level potentiometer 147. When the level 157 is reached, the beam intensity remains substantially constant even though the average DC component continues to want to move away from B+++. It should be noted that once level 93 is reached, the average DC component will be clamped at a corresponding voltage value because of the loop gain of the system. Two transistors are used in the beam limiter system 126 to provide sufficient power gain to allow the curve 156 to have a relatively flat response after level 93 is reached.

The beam limiter system 126 further includes a capacitor 158 and a resistor 160 between conductor 128 and ground to prevent system oscillation. Capacitor 162 on base 130 and capacitor 164 on emitter 146 further add to this protection.

As stated before, it is desirable that instantaneous high brightness conditions not be affected by the beam limiter system 126 to minimize loss in picture detail. This is achieved by employing the final anode of cathode ray tube 38 as part of the sensing means because it has the effect of a large capacitor to ground and therefore acts as an integrator. Thus, during an instantaneous high brightness condition, the high voltage developed by high voltage system 50 does not change fast enough and therefore the control voltage applied to the beam limiter system 126 is not affected so that a dim scene as represented by signal 102 provides an instaneous high beam current indicated by spike 123 and details are retained.

Alternatively, potentiometer 147 may be fixed, and resistor 136 variable to adjust the threshold level. In such case, the resistance of potentiometer 104 would preferably be small compared to that of resistor 136 so that even though the total resistance between the emitter 134 and ground changes with the brightness setting and thus the threshold level 157 of FIG. 4 also changes, such change is only slight. In addition, because of the large difference in value between potentiometer 104 and resistor 136, once the threshold level 157 is reached, changing the setting of brightness potentiometer 104 will not increase brightness so that the viewer is unable to manually cause an excessive brightness condition.

The contrast control potentiometer 86 is connected to the emitter of video amplifier transistor 84 which is supplied from B+ through resistor 168 and potentiometer 86. Since transistor 84 is generally operated class A, when the video signal 19 is at the black level, current is drawn through potentiometer 86 and due to the DC coupling, an adjustment thereof will affect the black level of the signal applied to the cathode ray tube 38 in a manner similar to the effect of brightness control potentiometer 104. To prevent this, an additional B++ source is coupled through a resistor 170 to the top of potentiometer 86 of a value to provide zero drop across the potentiometer when the signal is black. Thus the setting does not affect the black level but only affects the deviation therefrom which is the object of the contrast control. This may be looked upon as a method of using DC coupling to provide the effect of an AC coupled contrast control.

The illustrated method of matrixing the luminance and chrominance components is merely illustrative and other known methods may be used and yet come within the scope of the invention. Although the invention has been described as being in a color television receiver, it may be appreciated that the beam limiter system 126 is useful in a DC coupled black and white set. Although the brightness control is generally physically limited in sets having a portion or all of the video signal AC coupled to the cathode ray tube 38 so that the possibility of an excessive beam intensity is reduced, there may be certain applications where such physical limiting is impractical in which case the beam limiter system may be employed even in an AC coupled set. It should be noted that such physical limiting of the brightness control in a DC coupled set is undesirable because it would severely reduce detail in order to maintain the average beam intensity below a safe value whereas in AC, changes in picture content do not change the average and therefore no loss in detail results from limiting very close to said safe value.

We claim:

1. In a color television receiver including a detector circuit for converting a received television signal into a video signal having a constant black level, a cathode ray tube having three input electrodes, a high voltage system for supplying high voltage to the final anode of the cathode ray tube, the combination of; a processing circuit direct current coupled to the detector circuit for converting the video signal into three color representative signals, three amplifier circuits for respective ones of the color representative signals direct current coupled between said processing circuit and respective ones of the three cathode ray tube input electrodes to retain the constant black level, with the total average beam current in the cathode ray tube being controlled by the sum of the average direct current components of the color representative signals, the latter components subject to having values to cause the total average beam current to exceed a predetermined level, an automatic beam limiter system comprising sensing means coupled to the high voltage system to derive a control voltage indicative of the total average beam current, a control circuit including amplifying means coupled to said sensing means to derive an output potential, a network connected between said amplifying means and separate ones of the three amplifier circuits to apply said output potential thereto, said control circuit including threshold means responsive to said control voltage being less than a threshold level to cause said output potential to be substantially constant to permit the average direct current components at the cathode ray tube input electrodes to freely vary the total average beam current, said threshold means having a value to cause said output potential to vary in proportion to the amount that said control voltage exceeds said threshold level to move the black level of the video signal in accordance therewith and in a direction to maintain the total average beam current constant at the predetermined level.

2. The television receiver according to claim 1 wherein said high voltage system includes a transformer winding across which recurring pulses occur, and a rectifier diode coupled between the top of the winding and the final anode of the cathode ray tube to apply a high voltage thereto the value of which varies with the total average beam current, said sensing means including resistor means coupled to the junction between said diode and the cathode ray tube.

3. The color television receiver according to claim 1 wherein said high voltage system includes a transformer winding across which recurring pulses appear, and a rectifier diode coupled between the top of the winding and the final anode of the cathode ray tube, said sensing means including resistor means coupled to the bottom of said winding.

4. The color television receiver according to claim 1 wherein each of said amplifier circuits includes a transistor having a first output electrode coupled to an associated one of the input electrodes of the cathode ray tube, a second output electrode coupled through said network to said operating potential, and an input electrode coupled to said processing circuit.

5. The color television receiver according to claim 1 wherein said amplifying means in said control circuit comprises a pair of cascaded emitter follower transistors, said control circuit further including means to control picture brightness by varying the black level of the color representative color signals at the cathode ray tube.

6. The color television receiver according to claim 1 wherein, each of said three amplifier circuits includes a first transistor of a given conductivity type having an emitter and a collector, and a second transistor of an opposite conductivity type having a base coupled to the collector of said first transistor and a collector coupled to an associated one of said input electrodes of said cathode ray tube, said amplifying means in said control circuit comprising a third transistor of said opposite conductivity type having an emitter, a collector and a base coupled to said sensing means, said threshold means comprising variable resistor means coupled to said base, said control circuit further including a potentiometer coupled between said emitter of said third transistor and a point of reference potential, a fourth transistor of said opposite conductivity type having an emitter coupled through said network to respective ones of the emitters of said first transistor, said fourth transistor further having a base and a collector, said potentiometer having a movable arm coupled to said base of said fourth transistor, said control circuit further including direct current potential supply means coupled to said collectors of said third and fourth transistors, said movable arm being adjustable to permit varying the brightness by changing the black level of the color representative signals applied to the cathode ray tube.

7. The color television receiver according to claim 1, the processing circuit further including class A video amplifier transistor direct current coupled to the detector circuit, an adjustable voltage divider for controlling picture contrast coupled between said transistor and a point of reference potential, the output signal from said transistor appearing at the movable arm of said voltage divider, means to furnish a supply potential for said transistor coupled to a point in said voltage divider on one side of said arm, and means to supply a further potential to a point on the other side of said arm of a value to provide substantially zero voltage drop between the two points when the video signal is at the black level, whereby said voltage divider is inoperable to control brightness.

8. A television receiver including a video detector and amplifier system having a direct current signal path coupled to a cathode ray tube for translating a video signal thereto, a highvoltage circuit for the cathode ray tube, the average direct current component of the video signal at the cathode ray tube subject to causing the average intensity of the cathode ray beam to exceed a predetermined level, said television receiver having an automatic beam limiter system including in combination:

sensing means coupled to the high voltage circuit for deriving a control voltage indicative of the average beam intensity;

an amplifier circuit including an amplifier transistor having base, emitter, and collector electrodes, with the collector-emitter circuit thereof direct current-coupled to the cathode ray tube and having signals obtained from the detector applied to the base thereof;

a control circuit including a second transistor having base, collector, and emitter electrodes, the collector-emitter path of the second transistor being connected in series with the collector-emitter path of the amplifier transistor; and means for applying the control voltage to the base of the second transistor, said second transistor being driven into saturation by the control voltage applied to its base so long as the control voltage is greater than a predetermined threshold level to cause a substantially constant output voltage to be supplied from the second transistor to the amplifier transistor to permit the average beam intensity to freely vary with the average direct current component of the video signal, the conductivity of the second transistor being reduced in proportion to the amount that the control voltage falls below said threshold level to thereby reduce the operating voltage for the amplifier transistor to, in turn, reduce the average beam intensity.

9. The combination according to claim 8 wherein the sensing means includes a voltage divider coupled to the high voltage circuit of the cathode ray tube, with the output of the voltage divider being connected with the base of the second transistor.

10. The combination according to claim 8 further including filter means connected between the sensing means and the base of the second transistor for preventing system oscillation.

11. The combination according to claim 8 wherein the circuit coupling the amplifier transistor to the cathode ray tube includes an output transistor having at least a base electrode and an output electrode, with the base electrode connected to the output of the amplifier transistor and the output electrode connected to the cathode ray tube.

12. The combination according to claim 11 wherein the second and output transistors are of one conductivity type and the amplifier transistor is of the opposite conductivity type with the emitters of the second and amplifier transistors being DC coupled together and with the collector of the amplifier transistor being DC coupled to the base of the output transistor.

References Cited

UNITED STATES PATENTS 3,009,989 11/1961 Ahrons et al. ........ 178—5.4

ROBERT L. GRIFFIN, Primary Examiner

ROBERT L. RICHARDSON, Assistant Examiner

U.S. Cl. X.R.

178—7.5